US012699524B2

(12) United States Patent
Xu et al.

(10) Patent No.: US 12,699,524 B2
(45) Date of Patent: Aug. 4, 2026

(54) INVERSE ERASE FOR MEMORY COMPONENTS

(71) Applicant: Micron Technology, Inc., Boise, ID (US)

(72) Inventors: Zhongguang Xu, San Jose, CA (US); Ronit Roneel Prakash, Minato City (JP)

(73) Assignee: Micron Technology, Inc., Boise, ID (US)

( * ) Notice: Subject to any disclaimer, the term of this patent is extended or adjusted under 35 U.S.C. 154(b) by 156 days.

(21) Appl. No.: 18/645,713

(22) Filed: Apr. 25, 2024

(65) Prior Publication Data

US 2024/0361945 A1     Oct. 31, 2024

Related U.S. Application Data

(60) Provisional application No. 63/461,745, filed on Apr. 25, 2023.

(51) Int. Cl.
*G11C 16/04*          (2006.01)
*G06F 3/06*           (2006.01)

(52) U.S. Cl.
CPC .......... *G06F 3/0652* (2013.01); *G06F 3/0604* (2013.01); *G06F 3/0679* (2013.01)

(58) Field of Classification Search
CPC ..... G06F 3/0652; G06F 3/0604; G06F 3/0679
See application file for complete search history.

(56) References Cited

U.S. PATENT DOCUMENTS

| | | | | |
|---|---|---|---|---|
| 10,643,711 B1 * | 5/2020 | Yuan | .................. | G11C 16/32 |
| 2009/0154264 A1 * | 6/2009 | Kux | .................. | G11C 16/3495 |
| | | | | 365/201 |
| 2016/0099061 A1 * | 4/2016 | Ziperovich | ........... | G11C 16/16 |
| | | | | 365/185.11 |

* cited by examiner

*Primary Examiner* — Pho M Luu
(74) *Attorney, Agent, or Firm* — Schwegman Lundberg & Woessner, P.A.

(57) ABSTRACT

The disclosed system configures a system component, such as a memory sub-system controller, to efficiently erase memory blocks. The controller receives a request to erase an individual memory component of a set of memory components. The controller applies an erase pulse to the individual memory component in response to the request. The controller, following application of the erase pulse, applies a pre-program pulse to the individual memory component.

20 Claims, 5 Drawing Sheets

400

405

RECEIVE A REQUEST TO ERASE AN INDIVIDUAL MEMORY COMPONENT OF THE SET OF MEMORY COMPONENTS

410

APPLY AN ERASE PULSE TO THE INDIVIDUAL MEMORY COMPONENT IN RESPONSE TO THE REQUEST

415

FOLLOWING APPLICATION OF THE ERASE PULSE, APPLY A PRE-PROGRAM PULSE TO THE INDIVIDUAL MEMORY COMPONENT

INVERSE ERASE FOR MEMORY COMPONENTS

PRIORITY APPLICATION

This application claims the benefit of priority to U.S. Provisional Application Ser. No. 63/461,745, filed Apr. 25, 2023, which is incorporated herein by reference in its entirety.

TECHNICAL FIELD

Embodiments of the disclosure relate generally to memory sub-systems and, more specifically, to erasing components of a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
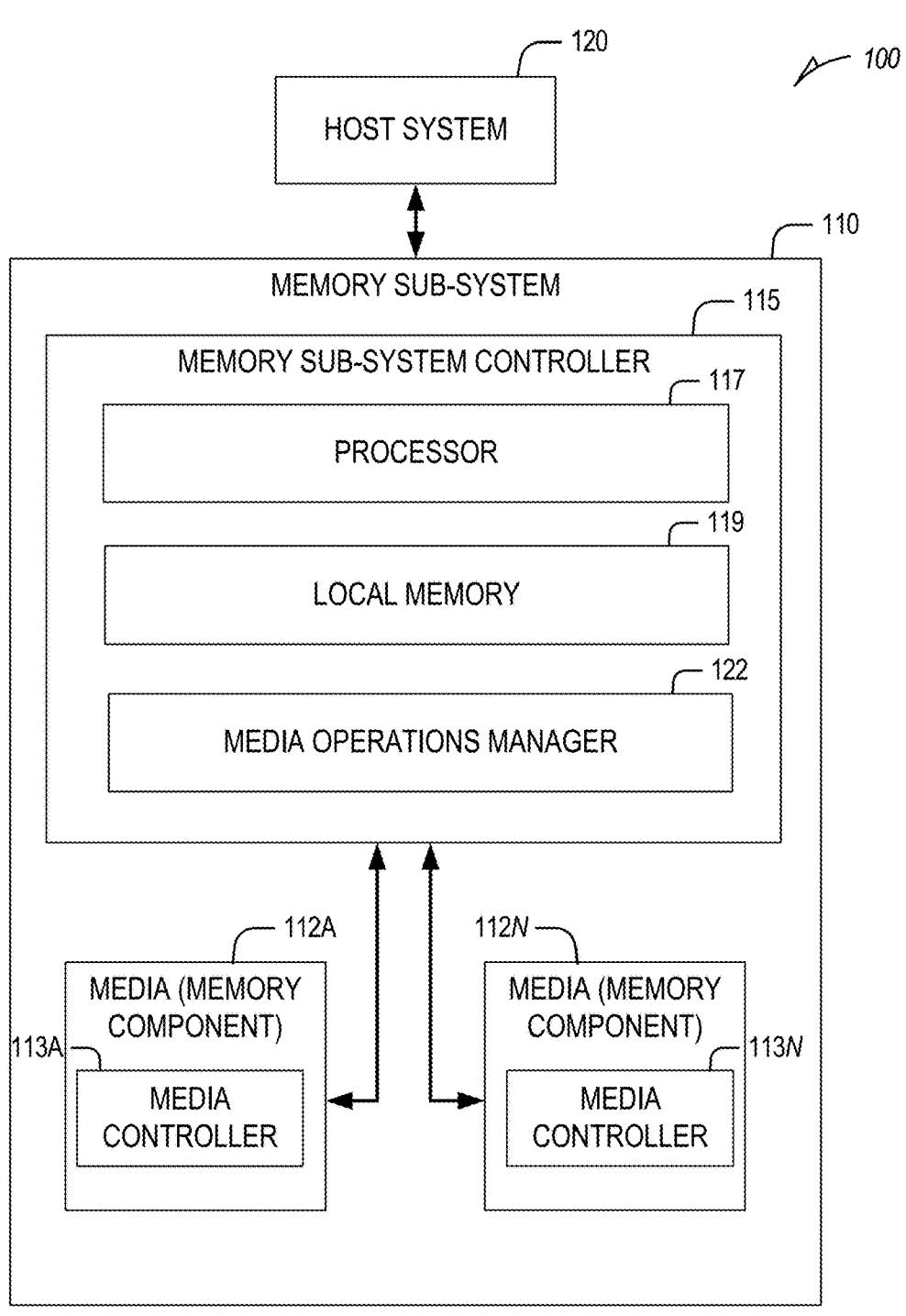
FIG. 1 is a block diagram illustrating an example computing environment including a memory sub-system, in accordance with some embodiments of the present disclosure.

Aspects of the present disclosure configure a system component, such as a memory sub-system controller, to erase blocks and/or components of a memory sub-system. The memory sub-system controller can receive a request to erase the memory component or a specified subset of the memory components. In response, the memory sub-system controller first applies an erase pulse and then applies a pre-program pulse to the memory component or the specified subset of the memory components. This erase process improves the manner in which memory cells are erased including good bad blocks (GBB). This process can also reduce the number of erase operations that need to be performed, which increases the overall efficiency of the memory sub-system and reduces latencies encountered by the host system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc. As part of writing data to the memory sub-system, the memory sub-system selects a block from a free block pool. The free block pool maintains blocks that contain no valid data and are ready to be erased and programmed. When data is transferred from a previous block to a new block that is in the free block pool, the new block is removed from the free block pool after being programmed with the valid data from the previous block. The previous block is then released as a new free block and added to the free block pool.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Typical systems erase blocks of a memory sub-system in multiple steps. For example, some typical memory sub-systems perform an erase operation that includes application of a pre-program pulse to the memory components followed by an erase pulse. The pre-program pulse is a relatively low voltage signal (e.g., voltage signal that is below a specified threshold or turn-on voltage) sent to the memory cell before programming and is configured to set up the memory cell for programming by ensuring the cell is in the correct state and ready to accept data. It is a pre-program pulse because the voltage level is not high enough to register or program data into any given memory cell but high enough to ensure the cell is in the correct state. This pre-program pulse lasts for a few microseconds and its voltage is much lower than the programming pulse. The erase pulse is a relatively high voltage signal (e.g., voltage signal that is above a specified threshold or turn-on voltage) sent to the memory cell and is configured to apply a high voltage to the memory cell to disrupt charges stored in the floating gate of the memory cell. This erase pulse can last for a few milliseconds and its voltage is much higher than the programming pulse. After applying these two pulses, the memory components are programmed with an outgoing pattern.

In some cases, the memory components include GBB. Specifically, a "bad block" refers to a physical block of memory that is no longer usable due to one or more defective memory cells within that block. Bad blocks are typically detected during the manufacturing process, or during the use of the memory device. A "good" block, on the other hand, is a block of memory that contains only functional memory cells and can be reliably used to store data. In some cases, bad blocks may be marked as "bad" by the memory controller, so that they are no longer used for storing data. This is typically done during the formatting process, where the memory controller scans the memory device for bad blocks and maps them out of the available memory space. This process ensures that the memory device continues to function properly, even in the presence of some faulty memory cells. Such blocks that are good. or not marked as bad, during the manufacturing process but that are ultimately marked bad by the memory controller can be referred to as GBB. Such GBB can be erased by applying the erase pulse in multiple stages and at different trim levels which may be proprietary.

In either case, generating the pre-program pulse prior to the erase pulse, results in the need to program a specified outgoing pattern which can take additional time and adversely impacts the efficiency of the memory sub-system. Also, performing special handling for erasing GBB consumes additional resources which further adversely impacts the efficiency of the memory sub-system.

Aspects of the present disclosure address the above and other deficiencies by providing a memory controller that erases blocks and/or components of a memory sub-system in a more efficient manner. The memory sub-system controller can receive a request to erase the memory component or a specified subset of the memory components. In response, the memory sub-system controller first applies an erase pulse and then applies a pre-program pulse to the memory component or the specified subset of the memory components. This erase process improves the manner in which memory cells are erased including GBB. This process can also reduce the number of erase operations that need to be performed, which increases the overall efficiency of the memory sub-system and reduces latencies encountered by the host system.

In some examples, the erase pulse includes an outgoing pattern. In some examples, the outgoing pattern is a solid pattern including one or more voltage levels that are within a threshold range of a neutral threshold voltage of the individual memory component.

In some examples, the memory sub-system controller determines that the individual memory component includes a GBB. In such cases, the erase pulse includes a first erase pulse, and the memory sub-system controller generates a second erase pulse following the first erase pulse and prior to the pre-program pulse in response to determining that the individual memory component includes the GBB. In some examples, the second erase pulse is at a different trim level than the first erase pulse. In some examples, the memory sub-system controller adds a threshold voltage corresponding to the GBB to the first erase pulse to generate the second erase pulse.

In some examples, the pre-program pulse is shorter (applied for less time) than the erase pulse. In some examples, the pre-program pulse raises one or more voltage levels of cells of the individual memory component that are below a threshold voltage level by a specified amount.

In some examples, the request includes a sanitize operation to erase all of the set of memory components of the memory sub-system including all user blocks. In some cases, the memory sub-system controller prevents performing a verify operation between application of the erase pulse and application of the pre-program pulse.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A, block or page of the first memory component 112A, or group of memory components including the first memory component 112A can be associated with a first reliability (capability) grade, value or measure. The terms "reliability grade," "value" and "measure" are used interchangeably throughout and can have the same meaning. The second memory component 112N or group of memory components including the second memory component 112N can be associated with a second reliability (capability) grade, value or measure. In some examples, each memory component 112A to 112N can store respective configuration data that specifies the respective reliability grade. In some examples, a memory or register can be associated with all of the memory components 112A to 112N, which can store a table that maps different groups, bins, or sets of the memory components 112A to 112N to respective reliability grades.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120.

Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Furthermore, the memory cells of the memory components 112A to 112N can be grouped as memory pages or blocks that can refer to a unit of the memory component 112 used to store data. For example, a single first row that spans memory components 112A to 112N can correspond to or be grouped as a first superblock and a single second row that spans memory components 112A to 112N can correspond to or be grouped as a second superblock. If the single first row includes all good blocks (e.g., each block in the single first row has a reliability grade above a threshold), the first superblock is a first complete superblock. If the single first row includes some bad blocks (e.g., one or more blocks in the single first row have a reliability grade below a threshold), the first superblock is a first incomplete superblock.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, garbage collection operations, different read disturb management, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the reliability grades and/or indications of defects in certain word line groups (WGRs) associated with different groups of the memory components 112N to 112N and/or different blocks within each of the memory components 112N to 112N. In some cases, the reliability grades are dynamic and can be updated by the memory sub-system controller 115 in response to determining that certain error rates are reached that transgress an error rate threshold. In such cases, the memory sub-system controller 115 marks such blocks or memory components as GBB.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to erase memory components 112A to 112N of the memory sub-system 110. The media operations manager 122 can receive a request to erase one or more memory components of the memory components 112A to 112N, such as from the host system 120 or another internal or external source. In response, the media operations manager 122 first applies an erase pulse and then applies a pre-program pulse to the one or more memory components.

This erase process improves the manner in which memory cells are erased including GBB. This process can also reduce the number of erase operations that need to be performed, which increases the overall efficiency of the memory sub-system 110 and reduces latencies encountered by the host system 120.

Figure 2:
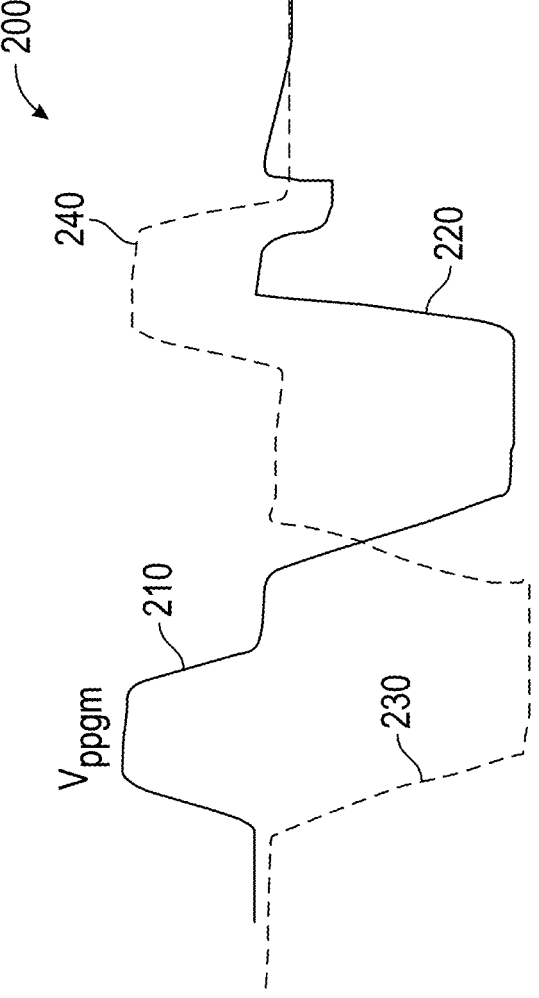
FIG. 2 is an example timing diagram for an erase operation, in accordance with some implementations of the present disclosure.

For example, two timing diagrams 200 are shown in FIG. 2 which represent conventional erase operations and the erase operations according to the disclosed techniques, respectively. The conventional erase operations first apply a pre-program voltage (Vpgm) 210 to one or more groups of cells, WLs, and/or memory components 112A to 112N of FIG. 1 that are requested to be erased. After the pre-program voltage (Vpgm) 210 is applied to the one or more groups of cells, WLs, and/or memory components 112A to 112N that are requested to be erased, the memory sub-system controller 115 of FIG. 1 can perform a verify operation and can apply an erase pulse 220. Subsequent to the erase pulse 220, the memory sub-system controller 115 can program an outgoing pattern to the one or more groups of cells, WLs, and/or memory components 112A to 112N that are requested to be erased. As such, the process for erasing one or more groups of cells, WLs, and/or memory components 112A to 112N involves multiple operations and steps.

According to the disclosed techniques, unlike the conventional operations, the media operations manager 122 of FIG. 1 receives a request to erase one or more groups of cells, WLs, and/or memory components 112A to 112N. For example, the media operations manager 122 can receive a sanitize operation to erase all of the set of memory components 112A to 112N of the memory sub-system 110 of FIG. 1 including all user blocks. In response, the media operations manager 122 first applies an erase pulse 230 to the one or more groups of cells, WLs, and/or memory components 112A to 112N that are requested to be erased. This erase pulse 230 can, in some cases, be broken up into multiple erase pulses. This can be the case for erasing a GBB. Following application of the erase pulse 230, the memory sub-system controller 115 applies a pre-program pulse 240 (Vpgm). By erasing the one or more groups of cells, WLs, and/or memory components 112A to 112N in this way, a verify operation is prevented from being performed. In addition, the erase pulse 230 can already include the programming of the outgoing pattern which reduces the number of operations that need to be performed. The outgoing pattern can be a solid pattern including one or more voltage levels that are within a threshold range of a neutral threshold voltage of the one or more groups of cells, WLs, and/or memory components 112A to 112N.

In some examples, the pre-program pulse 240 is shorter (applied for less time) than the erase pulse 230. In some examples, the pre-program pulse 240 raises one or more voltage levels of cells of the one or more groups of cells, WLs, and/or memory components 112A to 112N that are below a threshold voltage level by a specified amount. After the pre-program pulse 240 is applied, the one or more groups of cells, WLs, and/or memory components 112A to 112N are ready to be programmed by the memory sub-system controller 115.

In some examples, the media operations manager 122 determines that the one or more memory components include a GBB. In such cases, the media operations manager 122 generates two erase pulses. A first erase pulse and a second erase pulse following the first erase pulse that are each applied prior to the pre-program pulse in response to determining that the individual memory component includes the GBB. In some examples, the second erase pulse is at a different trim level than the first erase pulse. In some examples, the media operations manager 122 adds a threshold voltage corresponding to the GBB to the first erase pulse to generate the second erase pulse.

Figure 3:
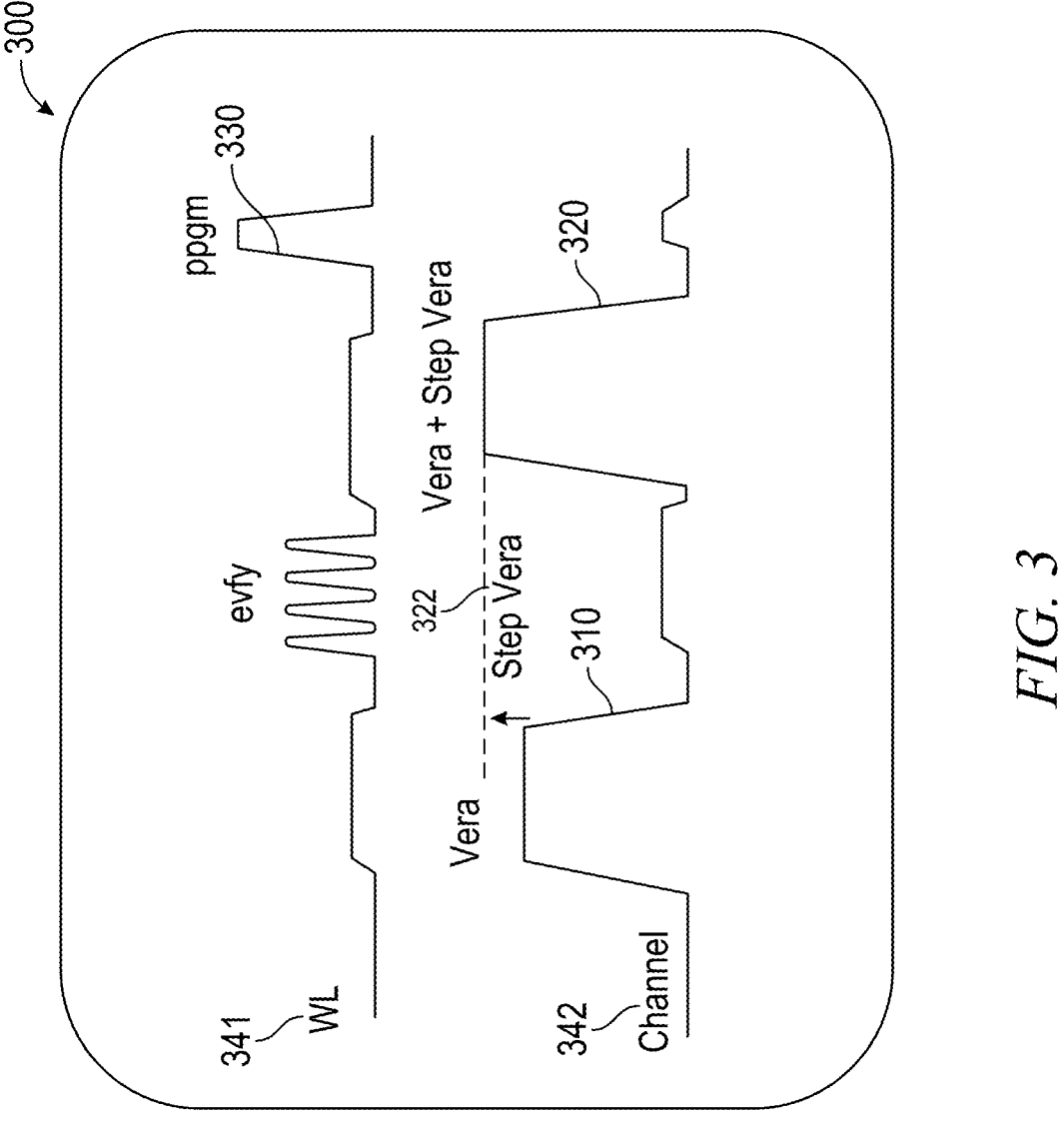
FIG. 3 is an example timing diagram for an erase operation, in accordance with some implementations of the present disclosure.

For example, as shown in the timing diagram 300 of FIG. 3, two erase pulses are applied to erase a GBB before a pre-program pulse is applied. For example, the memory sub-system controller 115 of FIG. 1 can determine that an individual memory component requested to be erased or identified as needing to be erased based on an erase operation is a GBB. In such cases, the media operations manager 122 of FIG. 1 generates a first erase pulse 310 (Vera or Verase) and applies the first erase pulse to a channel 342 of the GBB. In some cases, the first erase pulse 310 can be of a lower voltage and/or can be applied for a shorter duration of time than the erase pulse 230 of FIG. 2 applied to a component that is not a GBB.

After the first erase pulse 310 is applied to the channel 342 of the GBB, the media operations manager 122 accesses configuration data associated with the memory sub-system 110 of FIG. 1 and/or the GBB to determine a threshold trim level 322 (step) for an additional erase pulse. The media operations manager 122 adds the threshold trim level 322 to the voltage level of the first erase pulse 310 to generate a second erase pulse 320. The media operations manager 122 applies the second erase pulse 320 to the GBB. The second erase pulse 320 can be of a higher voltage and/or can be applied for a longer duration of time than the first erase pulse 310. After the first erase pulse 310 and the second erase pulse 320 have been applied to the GBB, the media operations manager 122 applies the pre-program pulse 330 to one or more WLs 341 of the GBB. The pre-program pulse 330 can be the same as the pre-program pulse 240 applied to a non-GBB block. After the pre-program pulse 330 is applied the process of erasing the GBB is completed.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 4:
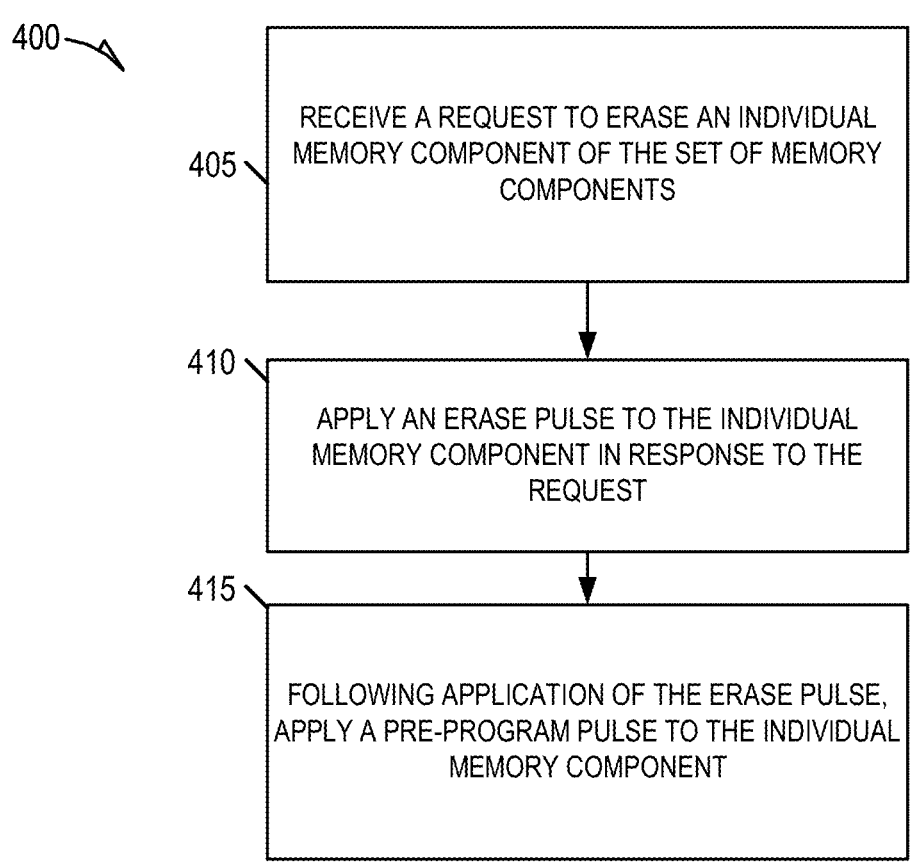
FIG. 4 is a flow diagram of example methods to perform erase operations on a memory sub-system, in accordance with some implementations of the present disclosure.

FIG. 4 is a flow diagram of example methods to perform erase operations on a memory sub-system, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated embodiments should be understood only as examples. The illustrated processes can be performed in a different order, and some processes can be performed in parallel. Additionally, one or more processes can be omitted in various embodiments. Thus, not all processes are required in every embodiment. Other process flows are possible.

Referring now FIG. 4, the method (or process) 400 begins at operation 405, with a media operations manager 122 of FIG. 1 of a memory sub-system (e.g., memory sub-system

110 of FIG. 1) receiving a request to erase an individual memory component of the set of memory components 112A-112N of FIG. 1. At operation 410, the media operations manager applies an erase pulse to the individual memory component in response to the request. Then, at operation 415, the media operations manager 122 following application of the erase pulse, applies a pre-program pulse to the individual memory component.

In view of the disclosure above, various examples are set forth below. It should be noted that one or more features of an example, taken in isolation or combination, should be considered within the disclosure of this application.

Example 1. A system comprising: a set of memory components of a memory sub-system; and a processing device operatively coupled to the set of memory components, the processing device being configured to perform operations comprising: receiving a request to erase an individual memory component of the set of memory components; applying an erase pulse to the individual memory component in response to the request; and following application of the erase pulse, applying a pre-program pulse to the individual memory component.

Example 2. The system of Example 1, wherein the erase pulse comprises an outgoing pattern.

Example 3. The system of Example 2, wherein the outgoing pattern is a solid pattern comprising one or more voltage levels that are within a threshold range of a neutral threshold voltage of the individual memory component.

Example 4. The system of any one of Examples 1-3, the operations comprising: determining that the individual memory component comprises a good bad block (GBB), the GBB being a block that has been transitioned into bad block status after initially being in good block status during manufacture of the memory sub-system.

Example 5. The system of Example 4, wherein the erase pulse comprises a first erase pulse, the operations comprising: generating a second erase pulse following the first erase pulse and prior to the pre-program pulse in response to determining that the individual memory component comprises the GBB.

Example 6. The system of Example 5, wherein the second erase pulse is at a different trim level than the first erase pulse.

Example 7. The system of any one of Examples 5-6, the operations comprising: adding a threshold voltage corresponding to the GBB to the first erase pulse to generate the second erase pulse.

Example 8. The system of any one of Examples 1-7, wherein the pre-program pulse is shorter than the erase pulse.

Example 9. The system of any one of Examples 1-8, wherein the pre-program pulse raises one or more voltage levels of cells of the individual memory component that are below a threshold voltage level by a specified amount.

Example 10. The system of any one of Examples 1-9, wherein the request comprises a sanitize operation to erase all of the set of memory components of the memory sub-system including all user blocks.

Example 11. The system of any one of Examples 1-10, the operations comprising: preventing performing a verify operation between application of the erase pulse and application of the pre-program pulse.

Methods and computer-readable storage medium with instructions for performing any one of the above Examples.

Figure 5:
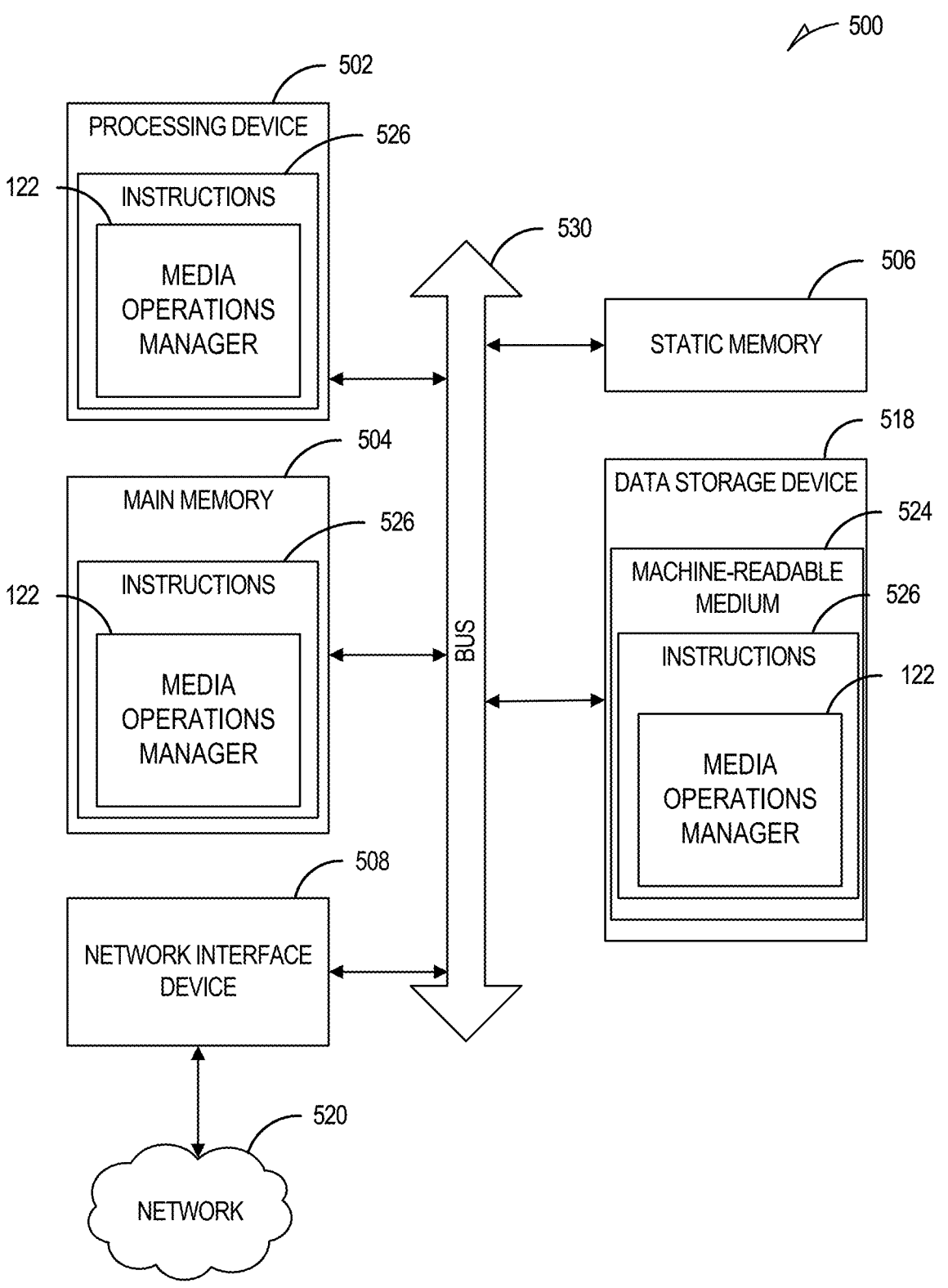
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage device 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 can correspond to the memory sub-system 110 of FIG. 1.

In one embodiment, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader embodiments of the disclosure as set forth in the following claims. The specification and drawings are, accordingly, to be regarded in an illustrative sense rather than a restrictive sense.

What is claimed is:

1. A system comprising:
a set of memory components of a memory sub-system; and
a processing device operatively coupled to the set of memory components, the processing device being programmed to perform operations comprising:
    receiving a request to erase an individual memory component of the set of memory components;
    applying an erase pulse to the individual memory component in response to the request; and
    following application of the erase pulse, applying a pre-program pulse to the individual memory component, the pre-program pulse raising one or more voltage levels of cells of the individual memory component that are below a threshold voltage level by a specified amount.

2. The system of claim 1, wherein the erase pulse comprises an outgoing pattern.

3. The system of claim 2, wherein the outgoing pattern is a solid pattern comprising one or more voltage levels that are within a threshold range of a neutral threshold voltage of the individual memory component.

4. The system of claim 1, the operations comprising:
determining that the individual memory component comprises a good bad block (GBB), the GBB being a block that has been transitioned into bad block status after initially being in good block status during manufacture of the memory sub-system.

5. The system of claim 4, wherein the erase pulse comprises a first erase pulse, the operations comprising:
generating a second erase pulse following the first erase pulse and prior to the pre-program pulse in response to determining that the individual memory component comprises the GBB.

6. The system of claim 5, wherein the second erase pulse is at a different trim level than the first erase pulse.

7. The system of claim 5, the operations comprising:
adding a threshold voltage corresponding to the GBB to the first erase pulse to generate the second erase pulse.

8. The system of claim 1, wherein the request comprises a sanitize operation to erase all of the set of memory components of the memory sub-system including all user blocks.

9. The system of claim 1, the operations comprising:
preventing performing a verify operation between application of the erase pulse and application of the pre-program pulse.

10. A method comprising:
receiving a request to erase an individual memory component of a set of memory components;
applying an erase pulse to the individual memory component in response to the request; and
following application of the erase pulse, applying a pre-program pulse to the individual memory component, the pre-program pulse being shorter than the erase pulse.

11. The method of claim 10, wherein the erase pulse comprises an outgoing pattern.

12. The method of claim 11, wherein the outgoing pattern is a solid pattern comprising one or more voltage levels that are within a threshold range of a neutral threshold voltage of the individual memory component.

13. The method of claim 10, comprising:
determining that the individual memory component comprises a good bad block (GBB), the GBB being a block that has been transitioned into bad block status after initially being in good block status during manufacture of a memory sub-system comprising the set of memory components.

14. The method of claim 13, wherein the erase pulse comprises a first erase pulse, comprising:
generating a second erase pulse following the first erase pulse and prior to the pre-program pulse in response to determining that the individual memory component comprises the GBB.

15. The method of claim 14, wherein the second erase pulse is at a different trim level than the first erase pulse.

16. The method of claim 14, comprising:
adding a threshold voltage corresponding to the GBB to the first erase pulse to generate the second erase pulse.

17. The method of claim 10, wherein the pre-program pulse is shorter than the erase pulse.

18. A non-transitory computer-readable storage medium comprising instructions that, when executed by a processing device, cause the processing device to perform operations comprising:
receiving a request to erase an individual memory component of a set of memory components;
applying an erase pulse to the individual memory component in response to the request; and
following application of the erase pulse, applying a pre-program pulse to the individual memory component, the pre-program pulse raising one or more voltage levels of cells of the individual memory component that are below a threshold voltage level by a specified amount.

19. The non-transitory computer-readable storage medium of claim 18, wherein the erase pulse comprises an outgoing pattern.

20. The non-transitory computer-readable storage medium of claim 18, the operations comprising:
preventing performing a verify operation between application of the erase pulse and application of the pre-program pulse.

* * * * *